July 23, 1935.  C. DAVIES  2,008,751
FILTER
Filed Feb. 3, 1933
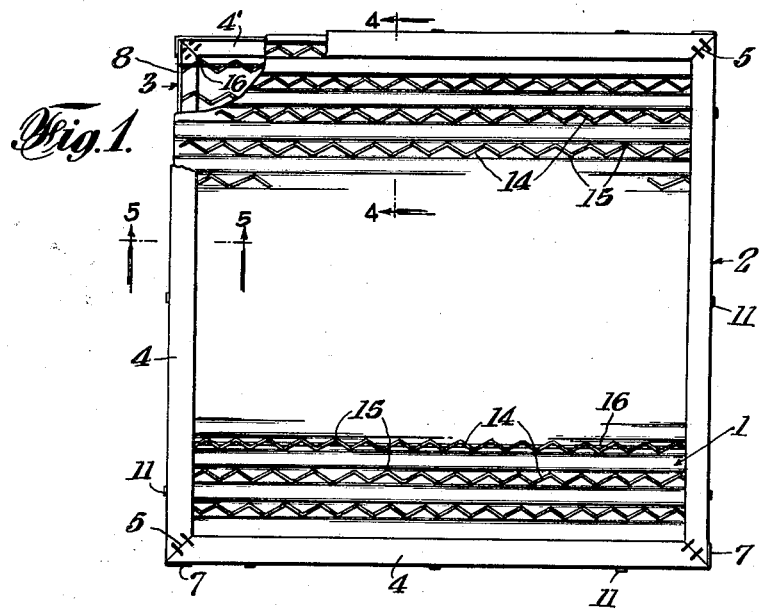
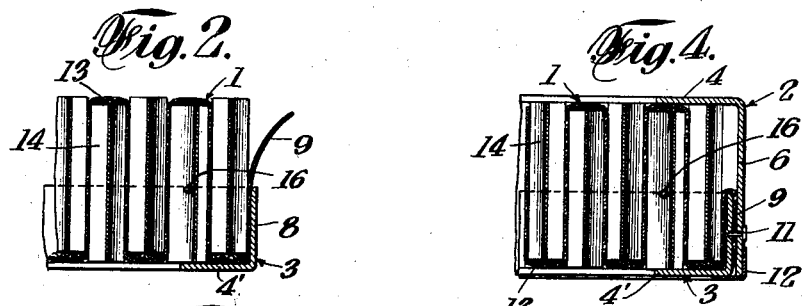
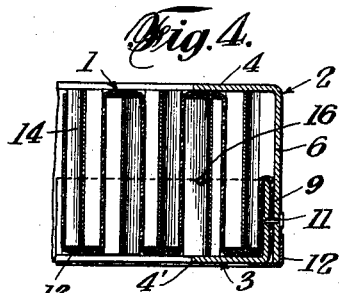
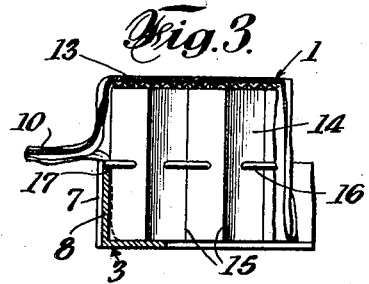
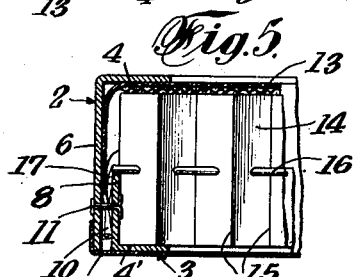
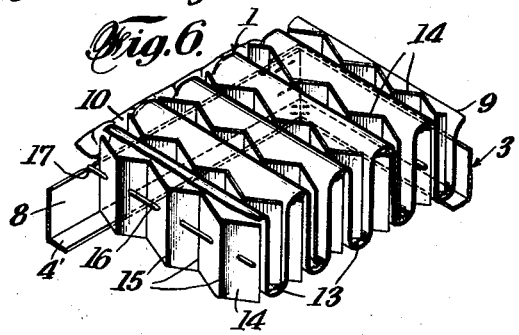
INVENTOR
CHARLES DAVIES
BY
Wm Katz
ATTORNEY

Patented July 23, 1935

2,008,751

UNITED STATES PATENT OFFICE 2,008,751

FILTER

Charles Davies, New York, N. Y.

Application February 3, 1933, Serial No. 655,007

8 Claims. (Cl. 183—71)

This invention relates to air filters intended to be used in ventilating systems. More particularly it relates to filters wherein the filtering medium comprises a body of vegetable fiber formed with a zig-zag cross-section in order to increase the filtering surface. As filtering material I utilize preferably some form of cellulose fiber such as cotton wadding which can be procured in long sheets which may be used in one or more plies or thicknesses as may be convenient. This material has only feeble mechanical qualities; and when used in large capacity filtering units such as are desirable for industrial and other large ventilating installations, the lack of rigidity of the material permits the several folds or zig-zags to bend, crumple, bow or flatten out, thus reducing the effective filtering surface and the efficiency of the filter.

It is, therefore, an object of my invention to provide a large capacity filter unit of this type wherein the mechanical weaknesses have been eliminated while at the same time the admirable filtering characteristics and the full efficiency of the material have been retained.

It is further the object of my invention to provide a large capacity filter unit of this type which shall be sturdy, efficient and economical in manufacture, handling, and use.

Other and further objects and advantages of my invention will become apparent from the description below of the preferred embodiment of my invention illustrated in the drawing, in which:

Fig. 1 is a plan view of the filter unit, parts being broken away at one corner to show the construction, and unnecessary repetition of structure at the middle of the figure being omitted, Figs. 2 and 3 are views similar to Figs. 4 and 5 respectively, the upper or outer frame being removed and the edge of the filter sheet being drawn out to show the manner of construction.

Figs. 4 and 5 are cross-sectional views of parts of the filter unit taken along lines 4—4 and 5—5 respectively of Fig. 1 looking in the direction of the arrows, Fig. 6 is a perspective view of one corner of the filter, the upper or outer frame member being removed, Fig. 7 is a detail showing part of the separator supporter, and Fig. 8 is a detail of a modification of the separator.

My filter comprises a sheet 1 of filtering material, such as cotton wadding or the like, folded into a zig-zag or waved cross-section; and held at the edges between telescoping upper and lower frames 2 and 3 respectively. These frames are constructed quite similarly; and together form a rectangular, open-faced box containing the filter proper. Thus the upper or outer frame 2 is made of four pieces of cardboard joined together. Each piece comprises a horizontal flange or guard strip 4, having its ends cut off diagonally to join and be secured, as at 5, to the similar ends of the adjacent pieces; and a depending skirt or side portion 6 extending the entire depth of the filter and provided laterally with a tab 7 which, as shown, is bent over and secured to the adjacent side. The several securing means hereinbefore referred to are shown as staples in the drawing, but it is clear that any other convenient means may be used. The lower or inner frame 3 is similar to the outer frame 2 in construction, but the upwardly extending side portion 8 is only half the height of the filter.

The end 9 of the filter sheet which is parallel to the crests of the folds or zig-zags is brought up along the inside of the side portion 8 and then bent over the edge of the latter to be caught between the telescoping sides 6 and 8 as shown in Figs. 2 and 4. The edge of the filter sheet transverse to the crests of the folds is flattened down to a plane midway between the crests, so that the flattened ends of the crests overlap as shown in Figs. 3 and 6 to form a flat rim portion 10 extending over the edge of the side 8. The flat rim portion 10 is then bent over and is caught between the telescoping sides 6 and 8 as shown in Fig. 5. In other words the filter sheet is formed with a median flat rim comprising the portions 9 and 10 extending over the top of the sides 8; and this flat rim is turned down and secured between the sides 6 and 8 when the outer frame 2 is telescoped over the inner frame 3. The sides 6 and 8 may be secured together by a series of clips 11; and a ribbon of paper or cloth 12 may be gummed or glued to frames 2 and 3 at the lower edge of side 6 to further secure them together and to close off the slight space between the sides 6 and 8.

The structure so far described is fairly satisfactory for small sizes such as are suitable for window ventilators; but in large sizes the increase in dimensions brings into prominence the lack of rigidity and other mechanical defects of the filter material. Rough handling such as is likely to occur in transportation, the volume and force of the air passing through the filter and other causes operate to flatten out the crests, to crumple or bend the folds against each other, to distort the entire filter sheet and in these and similar manners reduce the effective filtering surface. I will now describe the means which I have found successful in increasing the rigidity of the filter form and in preventing these various distortions.

At the bottom of each valley or interspace between the crests of the filter folds I lay a strip of stiff, coarsely-reticulated or screen like material, preferably sized textile material such as cheese cloth. These strips 13, on the one hand, operate to prevent the fold from pinching together at the bottom; and, on the other hand, serve as supports for means running through the interspaces for holding the folds a fixed distance apart. These means comprise preferably strips 14 of rigid material, preferably card-board, resting on the screens 13, extending to the face of the filter and running the length of the interspaces. The strips 14 are pleated or folded, the vertical fold lines 15 abutting against the sides of the filter folds. It will be noted that the ends of the strips 14 are engaged and held between the parallel horizontal flanges 4 and 4' of frames 2 and 3. Through certain of the separators 14, at suitable intervals in the series, I may thread a wire, rod or tube of metal, wood, cardboard or the like, said rod, or tube 16 having its ends resting in notches 17 or otherwise secured in the sides of the frame. I may also spread adhesive on the inside of sides 6 and 8 to fasten the latter to the end surfaces of the filter sheet and of the separators 14. In this case I may provide the separators 14 with an end flange 18 parallel to the side 8 as shown in Fig. 8, to take full advantage of the adhesive.

The separator 14 has only line contact with the filter sheet, so that obstruction of the filter surface is minimized and substantially the full surface is effective. At the same time the interspace is divided into a number of separate air ducts, the advantage of which is clear. The same result may be achieved in various equivalent ways, as for instance by using as separator a series of tubes or vertical cells placed side by side in the interspace. The rod 16 threaded through the separators 14, or rather through a part of them, prevents the mass bowing or flattening of the cardboard separators in cases where this is a possibility.

It is to be noted that, by virtue of the cheap and lightweight, though sufficiently rigid, materials used, my filter is notably light in weight and economical to produce and use. The low initial cost makes it economical to discard the filter at the end of its period of duty, thus dispensing entirely with the considerably more expensive cleaning and servicing necessary with the present day massive and expensive filters.

I claim:

1. A filter comprising a body of fibrous material formed with crests and valleys, a stiff, flat, coarsely-reticulated strip at the bottom of each valley, a folded strip of rigid material resting on the flat strip and contacting at the folds with the sides of the valley, and means to hold the strip of rigid material against endwise movement.

2. A filter comprising a pair of frames supporting therebetween a body of filtering material formed with a zig-zag cross-section, a separator extending along the spaces between successive zig-zags, and means extending through and engaged with the separator and secured at its ends to the frames.

3. A filter insert comprising open faced frames having portions telescoping with each other, a filter body formed with transverse corrugations and flat end portions transversely of the corrugations, and means to hold the flat end portions engaged between the telescoping portions of the frames.

4. A filter insert comprising open faced frames having portions telescoping with each other, a filter body formed with a transversely corrugated central portion and a circumferential rim portion, and means to hold the rim portion engaged between the telescoped portions of the frames.

5. A filter comprising a body of fibrous material formed with crests and valleys, a strip of rigid material resting upon the bottom of each valley, said strip being folded along fold lines extending from the bottom to the top of each valley and contacting the opposite sides of the valley at and substantially only at the fold lines.

6. A filter comprising a body of fibrous material formed with crests and valleys, a strip of rigid material resting upon the bottom of each valley, said strip being folded along fold lines extending from the bottom to the top of each valley and contacting the sides of the valley at and substantially only at the fold lines, and means to hold said strip against lateral movement.

7. A filter insert comprising a pair of open faced frames, a filtering body held between said frames comprising a sheet of fibrous material formed with crests and valleys, a strip of rigid material resting upon the bottom of each valley and folded zig-zag fashion to contact opposite sides of the valley and means on the frames extending transversely over the crests and valleys to prevent the said strips from working out of the valleys.

8. A filter insert comprising an open faced frame, a filtering body held therein and comprising a sheet of fibrous material formed with crests and valleys, a strip of rigid material resting upon the bottom of each valley and folded zig-zag fashion to contact opposite sides of the valley, and means on the frame extending transversely over the crests and valleys to prevent the said strips from working out of the said valleys.

CHARLES DAVIES.